Patented Aug. 7, 1934

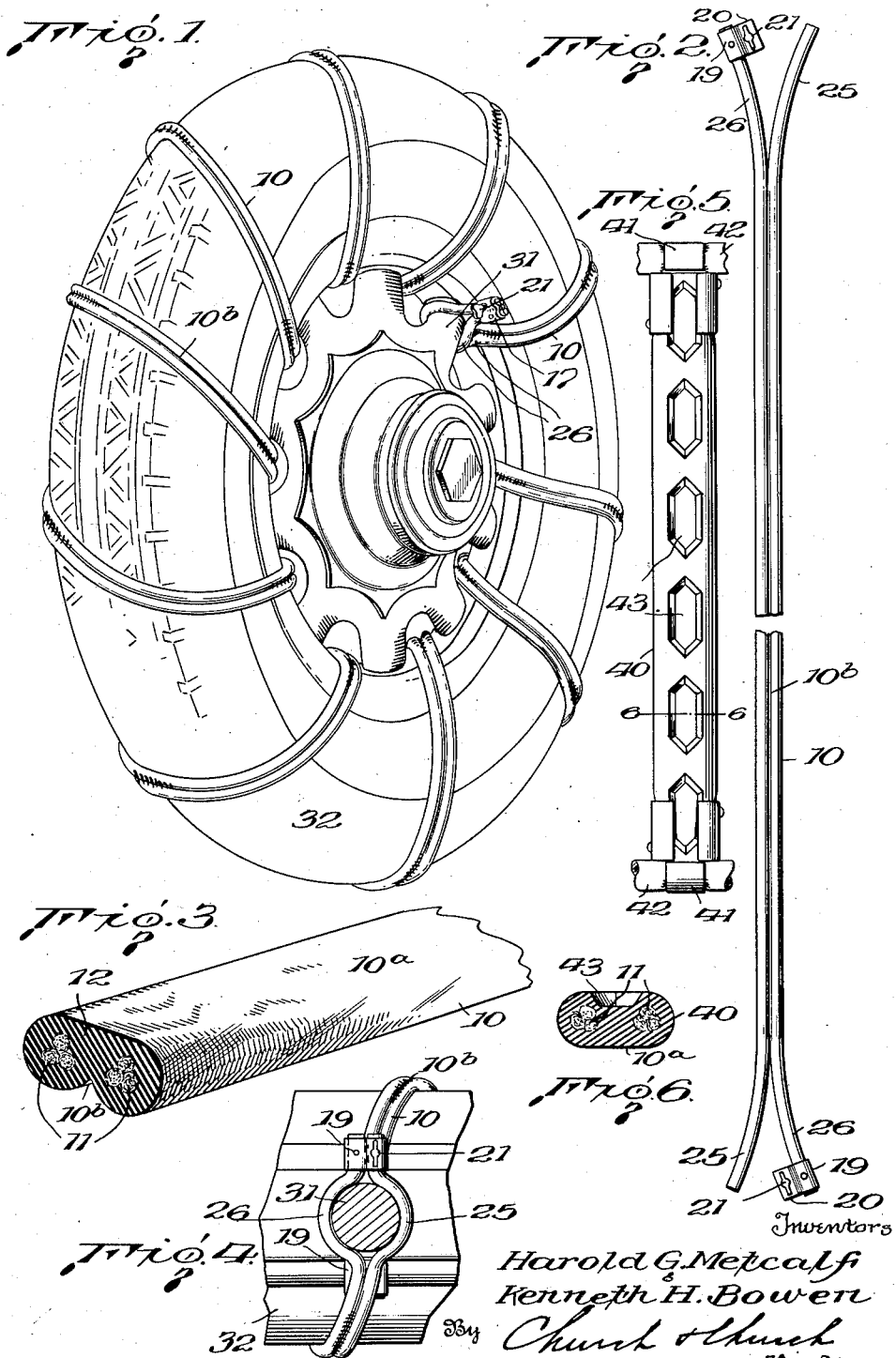

1,968,952

UNITED STATES PATENT OFFICE 1,968,952

ANTISKID DEVICE

Harold G. Metcalf and Kenneth H. Bowen, Auburn, N. Y., assignors to Columbian Rope Company, Auburn, N. Y., a corporation of New York Application October 17, 1932, Serial No. 638,201

3 Claims. (Cl. 152—14)

This invention relates to improvements in antiskid devices for vehicles, and has for its primary object the provision of a device which is simple and efficient in operation; is economical to manufacture; and which permits the device to be readily applied to and removed from the vehicle.

Another object contemplates the production of an anti-skid device that will be noiseless when in use and will not set up vibration in the vehicle body.

A still further object is the production of an anti-skid device from which substantially maximum wear can be obtained, notwithstanding the fact that the present device is of considerably less weight than the usual anti-skid devices.

More specifically, the present device preferably consists of an elongated member adapted to be spiralled around the wheel of the vehicle, two of the devices constituting a pair which may be applied to the rear wheels of the vehicle. In this form of the invention, said member is of non-circular cross-section, this construction being obtained by utilizing laterally spaced core members, preferably two. The laterally spaced core members increase the width of the anti-skid device so that the load is distributed over a comparatively large area, thus prolonging the life of said device, particularly in that pulverization and disintegration of the core members, which are preferably fiber, twisted or untwisted, is prevented.

With these and other objects in view the invention consists in certain details of construction and combinations and arrangements of parts, all as will hereinafter be more fully described and the novel features thereof particularly pointed out in the appended claims.

In the accompanying drawing,

Figure 1 is a perspective view of a vehicle wheel showing the invention, in one of its embodiments, applied thereto;

Fig. 2 is a perspective view of a portion of the anti-skid element portrayed in Fig. 1, illustrating the dual core construction;

Fig. 3 is a plan view of the device shown in Fig. 1;

Fig. 4 is a section through one of the wheel spokes illustrating the mode of attaching the member shown in Fig. 1;

Fig. 5 is a detail view of a cross member, embodying the present invention that may be utilized in making up a modified form of anti-skid device; and Fig. 6 is a sectional view on the line 6—6 of Fig. 5.

In the form of invention illustrated in Figs. 1 to 4, the anti-skid element 10 is applied to the wheel in spirals, extending transversely of the wheel tread and with the spirals of the two rear wheels of the vehicle laid in opposite directions. With this application of two elements to the two wheels, skidding of the vehicle will be confined to a line extending in the normal direction of traffic of the vehicle and all lateral skidding will be eliminated.

Preferably, the element 10 is formed of a rubber exterior and means which render said element substantially inextensible. The important factors are that the elements shall possess sufficient resiliency to eliminate noise and prevent setting up of vibration in the vehicle body, and that it shall have a yielding, non-abrading exterior surface, to prevent defacement of the wheel. The element 10 is spirally wrapped around the wheel 32, as shown in Fig. 1, with its ends attached to the wheel spoke 31 and portions intermediate its ends traversing the wheel tread. It will be seen that those portions of the element traversing the wheel tread are the equivalent of the cross members of the ordinary anti-skid device. Preferably, the member 10 is non-circular in cross section, being provided with a comparatively broad flat surface 10a, adapted to lie against the tread of the vehicle wheel. The opposite face, or that surface of the element which engages the roadway is preferably formed with an irregular surface which will increase its capacity to resist skidding. As shown in Figs. 1 to 4, this is preferably accomplished by having the element formed with a plurality of laterally spaced core members 11, the rubber covering 12 being formed with the depression 10b which may or may not extend throughout the length.

The use of the dual core members 11 also lends to the easy attachment of member 10 to the vehicle wheel. That is, the ends of the element may be bifurcated on a line between the two cores to form the bifurcations 25, 26 at each of the opposite ends and the fastening member which may be in the form of the attachment 19 formed with eyelet 20 and clamping screw 21 permanently attached to one of the bifurcations at each end. With this construction, the bifurcations at each end may be placed around the spoke or spokes of the wheel and their free ends fastened together as shown in Fig. 4, thereby securely attaching the device on the wheel.

In lieu of a continuous member 10, the invention may readily be incorporated in cross members such as are illustrated in Figs. 5 and 6.

These cross members, indicated at 40, are adapted to be secured, as by the clamping means 41, to side members 42 that extend circumferentially around the sides of the wheel. These individual cross members are formed with dual cores 11 which lend width to the member so that the latter may be formed with the broad, flat surface 10a to engage against the vehicle wheel, but, in lieu of a continuous depression in the road-engaging surface of the cross member, a series of longitudinally extending depressions 43 may be formed in the road-engaging surface.

In both forms of the invention, the portions of the device that extend across the vehicle wheel tread receive the greatest amount of wear along their edges which first come in contact with the roadway. These edges which might be called the leading edges naturally have the greatest amount of abrasion imposed thereon, and, consequently, wear away more quickly than in the case of the rear edge of the tread-traversing portions. However, this does not have any serious affect on the life of the device, because its construction is such that the tread-traversing portions may be readily reversed so that, after one edge has become worn, the device may be applied reversely and the wear placed upon what would then be the unworn edge.

As previously mentioned, the core members 11 are preferably of fiber. These fibers may be twisted together in any desired form, although a conventional three-strand rope is shown in the present instance. In each instance, however, the cores are preferably impregnated with a solution of latex or the equivalent thereof, which will effect a lubrication of the fibers, after the rubber covering 12 is vulcanized. The core not only adds tensile strength to the anti-skid element, but it renders it substantially inextensible, and aids in maintaining the normal shape or cross section of the element. Furthermore, when the portions of the element traversing the wheel tread engage the road surface, there may be a tendency for the element to twist, but the core members will resist such twisting motion, or augment the untwisting of the element as it passes out of contact with the road surface in the event the element may have twisted to any extent. This is true of both forms of the invention shown in the present instance.

This application is a continuation in part of applicants' co-pending application, Serial No. 605,962.

What we claim is:

1. An anti-skid device comprising an element adapted to traverse the tread of a vehicle wheel, said element being composed of a plurality of laterally spaced core members and a covering of rubber, the tread engaging face of said element being broad and flat and the opposite face of said element being recessed intermediate the individual core members.

2. An anti-skid device comprising an element adapted to traverse the tread of a vehicle wheel, said element being composed of two laterally spaced longitudinally extending groups of fibers and a rubber covering enclosing said fibers, the tread engaging face of said element being comparatively broad and flat.

3. An anti-skid device comprising an element adapted to traverse the tread of a vehicle wheel, laterally spaced core members in said element, the ends of said element being bifurcated with a core member in each bifurcation, and attaching means permanently secured to one bifurcation at each end of said element, the other bifurcation at each end being detachably secured to said attaching means.

HAROLD G. METCALF.
KENNETH H. BOWEN.